Figure 1:
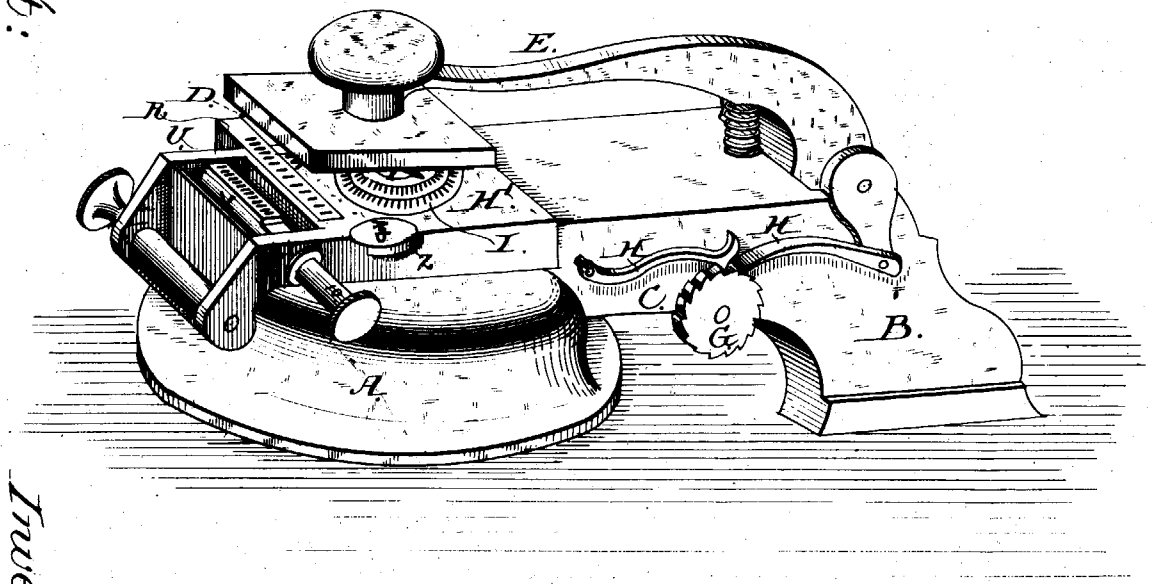

3 Sheets—Sheet 1.

G. E. EMERSON,

Assignor, by mesne assignments, of one-half to J. EMERICH and A. BURR.

DATING, CANCELING, AND OTHER STAMPS.

No. 9,910. Reissued Oct. 25, 1881.

Attest:
Walter Fowler,
A. K. Evans

Inventor;
Geo. E. Emerson
by A. H. Evans & Co.
Attys

3 Sheets—Sheet 2.

G. E. EMERSON,

Assignor, by mesne assignments, of one-half to J. EMERICH and A. BURR.

DATING, CANCELING, AND OTHER STAMPS.

No. 9,910. Reissued Oct. 25, 1881.

Attest:
J. Walter Fowler,
R. K. Evans

Inventor;
Geo. E. Emerson
by A. N. Evans & Co.
Attys

3 Sheets—Sheet 3.
G. E. EMERSON,
Assignor, by mesne assignments, of one-half to J. EMERICH and A. BURR.
DATING, CANCELING, AND OTHER STAMPS.
No. 9,910. Reissued Oct. 25, 1881.
Fig. 3.
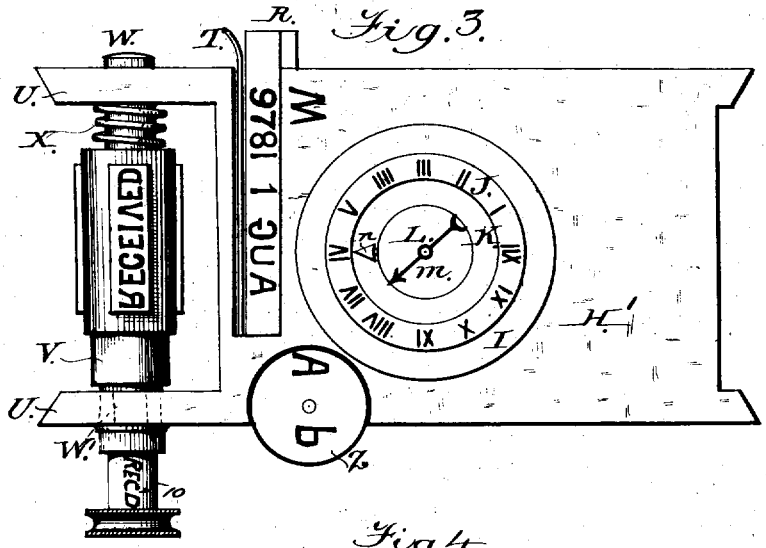
Fig. 4.
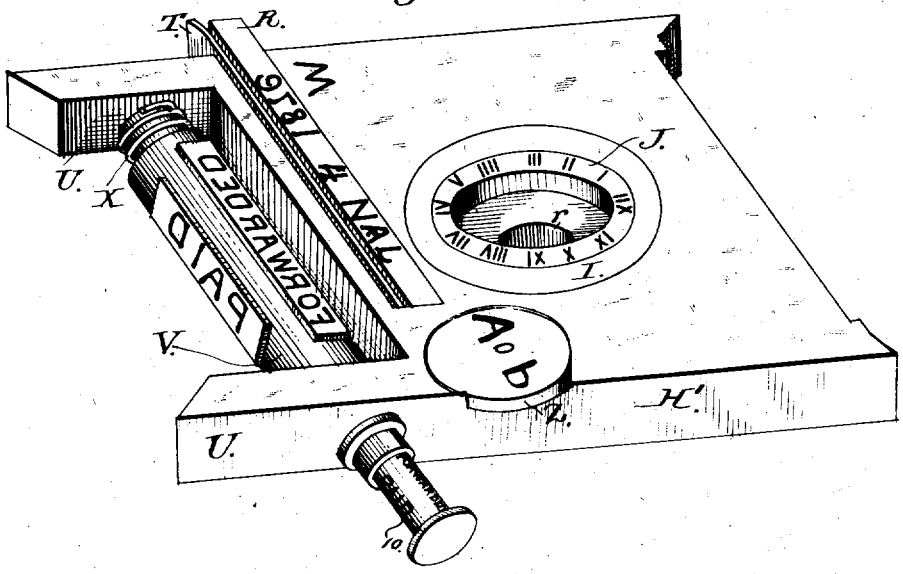
Attest;
S. Walter Fowler.
R. K. Evans
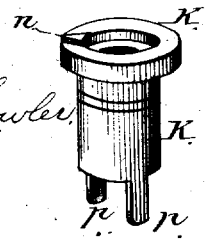
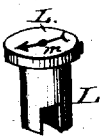
Inventor:
Geo. E. Emerson
by A. H. Evans & Co.
Attys

UNITED STATES PATENT OFFICE.

GEORGE E. EMERSON, OF SAN FRANCISCO, CALIFORNIA, ASSIGNOR, BY MESNE ASSIGNMENTS, OF ONE-HALF TO JOE EMERICH AND AMOS BURR, OF SAME PLACE.

DATING, CANCELING, AND OTHER STAMPS.

SPECIFICATION forming part of Reissued Letters Patent No. 9,910, dated October 25, 1881.

Original No. 224,666, dated February 17, 1880. Application for reissue filed November 18, 1880.

*To all whom it may concern:*

Be it known that I, GEORGE E. EMERSON, of the city and county of San Francisco, and State of California, have invented an Improvement in Dating, Canceling, and other Stamps; and I hereby declare the following to be a full, clear, and exact description thereof.

My invention relates to certain improvements in that class of stamps which are employed for marking, dating, canceling, or otherwise impressing various documents, and at the same time indicating the hour and minute at which such impression is made; and it consists of the ordinary horizontal fixed die having the usual official marks, letters, or figures upon it, and within this die a clock or time-dial, forming a part of or permanently fixed within it upon the bed-plate of the stamp. In combination with this stationary die I employ two indicators, hands, or pointers, which are moved by a clock or timing mechanism beneath, so as to mark by the dial the hour and minute at which the impression is made without the use of any automatically-moving dial or other mechanism.

My invention further relates to a novel means of moving the indicating-pointer by a direct vertical connection with clock-movement, while the latter is at the same time relieved from all the effects of concussion by the blows of the stamp. In combination with this mechanism I employ a peculiar meridian-disk, by which the ante and post meridian divisions of time are indicated, and also a cylindrical die rotating at right angles with the horizontal die, and having the words "Canceled," "Received," "Audited," &c., formed upon it. This cylindrical die is provided with an adjusting and locking device, by which any desired word or character upon it may be instantly brought uppermost and locked in position for use. The letters and figures of the date are fitted into a dovetailed slide, which is easily introduced to or removed from the bed-plate when the date is to be altered.

Figure 2:
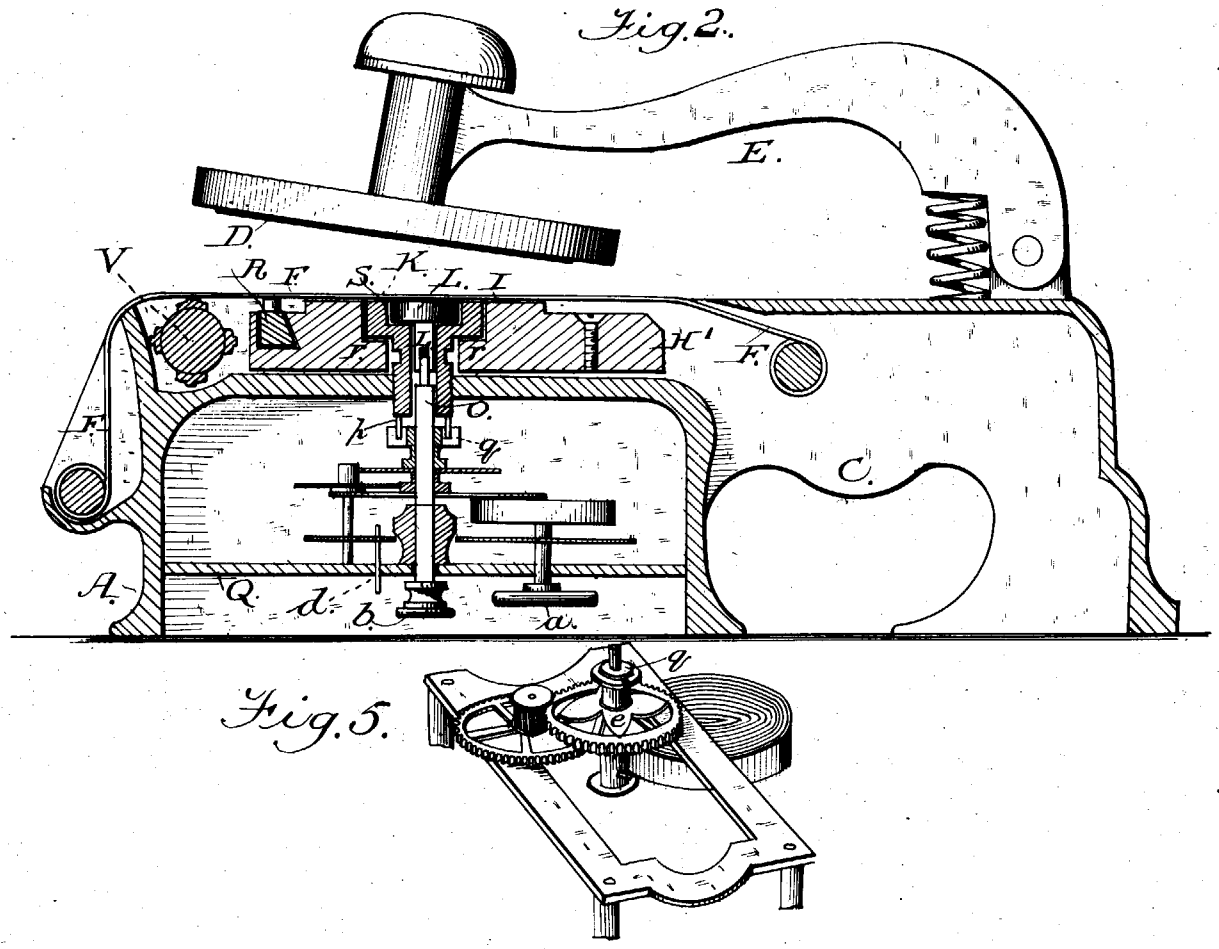

Referring to the accompanying drawings for a more complete explanation of my invention, Figure 1 is a view of my invention. Fig. 2 is a longitudinal section. Figs. 3, 4, and 5 are details of construction.

Various attempts have been made to combine a timing and stamping apparatus in one machine; but this hitherto has been effected by a multiplicity of automatically-moving dials and meridian-wheels, which necessitated complicated gearing and intermediate mechanism, to connect it with a more or less distant clock-movement, so as to protect the latter from injury, and also in devices for restoring lost motion in the moving dials, all of which have had the effect to render the apparatus exceedingly delicate, easily deranged, and unfitted for practical use.

In my invention I employ the ordinary stamp having a bed-plate provided with fixed official and dial dies, dating letters and figures, meridian-disk, and such other words as may be desired, and a combination with these of two hands or pointers connected directly with a simple clock mechanism situated directly beneath the dials and hands.

The frame of the stamp is formed with a cavity to receive the clock mechanism, and has the usual hinged or other stamping-arm and impression-pad and the inking-ribbon with its feeding-pawls and ratchet.

The base of my stamp consists of a hollow portion, forming an inverted cup, as shown at A, to contain the timing mechanism, and a foot, B, which is united to the part A by an arch or connecting portion, C.

The impression-pad D is mounted in the free end of the arm or lever E, so as to have a universal movement to adjust its face, so as to fit the die or type in the usual manner. The arm E is hinged at the rear to the top of the arch C, in the usual form of this class of stamps, and the impression-pad is held up and withdrawn after each impression by means of a spiral or other spring, as shown. The inking-ribbon F passes around rollers situated within the frame at each side of the bed-plate, and is moved over the die, being actuated at each movement of the impression-pad lever E by the ratchet-wheel G and the double pawls H, in the usual manner, these parts having nothing in them novel.

The bed-plate H′ is secured to the top of the hollow clock-containing case A, and upon this plate is formed the name of the bank, office, or place of business, together with the figures or characters of a clock-dial, from 1 to 12, as at I J. These letters and figures are fixed to or form a part of the plate H′, so that they are permanent, while within the inner circle are fitted two concentric movable stems or disks, K L, each of which carries a suitable pointer or indicator upon its surface, in the manner of a clock-face; and in this construction of solid receiving letters and figures combined with the movable indicator-pointers lies the principal merit of my machine, as I am thus enabled to provide a stamp of equal solidity with the ordinary dating or canceling stamp, and having but few exterior moving parts.

The minute-hand *m* is in the form of a raised arrow or pointer upon the upper surface of the disk or stem L, which extends down through the bed-plate H into the case to connect with the clock-work or time mechanism. The hour-hand is in the form of an arrow-head or indicating-point, *n*, and it is raised above the surface of the ring or annulus forming the head of the outer stem, K. This outer stem is a cylindrical sleeve, which surrounds the stem L, and has an independent connection with the clock mechanism, as will be more fully described hereinafter.

The clock mechanism is of any ordinary simple form of escapement, and is secured to a plate, Q, which may easily be introduced to or removed from the case A. The spindle O, which actuates the minute-hand, has its upper end flattened, and the lower end of the stem L is formed with a long slot, which will fit over the flattened end of the spindle, so that the stem will be turned by it, and thus actuate the indicator *m* upon its upper surface. The sleeve K, carrying the hour-hand, has two studs, *p p*, projecting downward from its lower end, and these studs fit into corresponding slots in a disk, *q*, driven at the proper rate by the clock mechanism. This sleeve surrounds the spindle O, and the two indicators are thus driven directly from the timing mechanism without the intervention of levers or other intermediate connecting-gear. The movement and action of the clutches being in line vertically with their connecting-spindle and sleeve, it will be seen that while the pointers will be continuously rotated by the timing mechanism no blow upon or vertical motion of the indicator-stems can in any way be communicated to the mechanism below.

In order to sustain the indicators against the blows of the pad necessary to imprint the stamp, and hold them at all times on a level with the stationary words and figures on the plate H, and also to prevent such action from being in any way detrimental to the timing mechanism, I countersink the bed-plate H′ from its upper surface, so as to form a seat with a square shoulder, *r*, into which the annulus or disk carrying the hour-indicator fits. This depression supports the flange of the disk, so that it is as solid to resist the blows of the pad as the plate H itself. The inner stem, which carries the minute hand or indicator, has an enlarged disk or head, which fits into a depression in the head of the sleeve K, carrying the hour-hand, and a similar shoulder, S, in this depression supports the stem, so that any blow or concussion upon it will be supported and resisted in a vertical line with and by the shoulder *r* in the outer plate, H′. A groove is formed around the inner stem, L, and a pin or screw fits this groove and prevents its being withdrawn, while permitting its free rotation. The outer sleeve, K, is similarly secured within the bed-plate H, as shown. At one side of the circle containing the official letters or figures is the letter "M," while at the other side I fit a small disk, Z, which may be rotated horizontally in its seat. Upon one side of the face of this disk is the letter "A," and on the opposite side the letter "P." This is so placed that only one of these letters will lie beneath the inking-ribbon and impression-pad at one time. This enables me to turn the disk so as to use the letters "A" and "P," respectively, with the permanent letter "M," and thus indicate morning and afternoon.

The dating letters and figures are fitted into a dovetailed slide, R, which fits a similar slot or groove in the bed-plate just in front of the dial. A spring, T, is secured to the side of the slide, and by its elastic tension holds the slide in place, and steadies it without other fastening. The day, year, and month are formed so as to be easily removed or replaced in the slide, so as to be changed with but little trouble. The front part of the bed-plate H is formed with two extensions or arms, U, which serve as journal-boxes, between which the cylinder V revolves. This cylinder has the raised letters, words, figures, or characters formed upon its side, as may be demanded by the especial business in which the stamp is to be used, as "Forwarded," "Received," "Recorded," "Paid," "Audited," "Answered," "Canceled," &c., and on a projection, 10, by which this cylinder is turned, are indicating-words to correspond with and show the position of the words on the cylinder and beneath the inking-ribbon. One of the journals W of this cylinder is round, while the other journal, W′, has as many sides as there may be words or characters upon the cylinder. The extension or bearing U corresponding with this journal has a similarly-shaped opening, so that when this polygonal bearing is introduced into its socket the cylinder will be held firmly with whichever character or word may be desired uppermost. In order to make a rapid adjustment the opposite round journal W is made long enough to allow the whole cylinder to be pushed along in that direction until the polygonal bearing is out of its seat and the succeeding round portion (which is somewhat smaller) has entered it. This then allows the cylinder to be rotated until the desired word is uppermost, when the spiral spring X will force the angular bearing back into its socket or bearing and hold it there. This gives me a firmly-supported and at the same time easily-adjusted series of words or characters.

The winding-key *a* for the clock mechanism is permanently attached and projects through the plate Q, so as to be easily reached and operated. The milled head *b* also extends through the plate, and is connected with the hands, so that they may be easily set when desired. The regulator *d* is also operated from the same point.

My apparatus thus provides a strong and durable chronometric stamp, suitable for any office use, and especially valuable in such positions as the offices of train-dispatchers, where the time must be accurately taken. It contains the fewest possible moving parts, and by the employment of the fixed dials with moving pointers or indicators an imprint is given which is a fac-simile of a clock-dial, and is much more easily and correctly read than if a number of continually-changing dials were employed.

It will be manifest that in order to have the movement of the hands or indicators correspond with the face of a dial and type which will make a correct imprint, the movement of these hands must be reversed, and they must turn to the left instead of to the right. This may be done either by a specially-constructed movement, or, if an ordinary clock-movement be employed, the gears and pinions actuating the hands and the spindle for the same must be placed upon the opposite side of the frame from their ordinary position. In the present case the spindle O, which actuates the minute-hand, passes freely through the hub of its driving-gear and pinion, and is driven by frictional pressure of elastic washers, which are held against the hub by a pin passing through the spindle, and the milled head *b* being secured to the lower end of the spindle, the latter may be turned at any time to adjust the hands without affecting the clock-movement. The disk *q*, which drives the hour-hand, turns freely upon the spindle O, and, with its gear-wheel, has a certain amount of longitudinal motion upon it without affecting its rotary movements, thus allowing of an adjustment between it and the lugs *p* of the sleeve K, which it drives. The hub of this disk *q* rests upon a convex elastic plate, *e*, which is held down upon the side of the gear-wheel, so as to be driven by it, but at the same time to allow the disk to be moved around, so as to adjust the hour-hand independently of the minute-hand when necessary for regulating its position.

Having thus described my invention, what I claim as new, and desire to secure by Letters Patent, is—

1. The combination, substantially as hereinbefore set forth, of a stationary stereotyped representation of a time-dial, a type or a character representing a pointer movable concentrically within said dial, a time-train for moving said pointer, a platen for simultaneously taking an impression of said dial and its pointer, and a vertically-yielding connection between the said pointer and its motor.

2. The fixed letters or characters I and dial J, mounted upon the bed-plate, and having the movable pointers *m* and *n*, and the clock mechanism, as shown, in combination with the slide R, containing the dating letters and figures, and the stamp V, the whole combined substantially as and for the purpose herein described.

3. In a hand-stamp, the cylinder V, provided on its surface with raised characters, letters, or words, and having at one end a cylindrical bearing and at the other a bearing with a polygonal section, W′, in combination with the arms U U, one of which has an opening corresponding to journal-section W′, and the spring X, substantially as herein described, and for the purpose set forth.

4. The clock mechanism situated within the case A, directly beneath the stamp, and having the hour and minute disk *q* and spindle O, as shown, in combination with the hands or pointer-stems K L, standing in a line above said disk and spindle, and so united to them as to be rotated, while having a free vertical movement, substantially as herein described.

5. The stem L, carrying the minute-hand, and having its lower end slotted, as shown, and the sleeve K, carrying the hour-hand, and having the lugs *p* at its lower end, in combination with the spindle O, having a flattened end, and the slotted disk *q* of the clock mechanism, whereby a direct vertical connection is made to drive the index-hands without conveying the concussions of the impression-pad to the clock mechanism, substantially as herein described.

6. In a stamp consisting of a cylinder or body, V, having the raised characters, figures, or words upon two or more sides, and adapted to receive a blow from an impression-pad, so as to imprint the characters upon a document, the polygonal journal W′, having its sides corresponding with the characters upon the body and fitting into a similarly-shaped socket in the bearing-arm, the elongated cylindrical journal W, spring X, and the indicating cylinder-extension to the journal, having characters corresponding with those upon the stamp, whereby its adjustment may be secured, substantially as herein described.

7. In a chronometric stamp having a clock mechanism adapted to drive the movable index-hands or pointers by a loose direct connection, as shown, the immovable letters, characters, or dials forming a part of or fixed to the bed-plate in line above the clock mechanism and case, and concentric with its driving-spindle, in combination with an impression-pad, whereby the time of an impression may be indicated upon a document, substantially as herein described.

8. In a chronometric stamp having a clock mechanism adapted to drive a movable index hand or hands, a fixed bed-plate with immovable dials or characters and an impression-pad, as shown, the hollow clock-containing case A, forming a support for or part of the bed-plate and dials, and in line directly below the same, the foot B, the connecting-arch C, and the arm E, for supporting and actuating the impression-pad, when the whole are combined substantially as herein described.

GEO. E. EMERSON.

Witnesses:

A. H. EVANS,

JNO. L. CONDRON.